United States Patent [19]

Farrar et al.

[11] Patent Number: 4,778,836
[45] Date of Patent: Oct. 18, 1988

[54] PROCESS FOR DISPERSING POLYMER GEL PARTICLES IN AQUEOUS MEDIUM

[75] Inventors: David Farrar, West Yorkshire; John Robinson, Yorkshire; Peter Flesher, West Yorkshire, all of England

[73] Assignee: Allied Colloids Limited, West Yorkshire, England

[21] Appl. No.: 749,294

[22] Filed: Jun. 27, 1985

[30] Foreign Application Priority Data

Jun. 28, 1984 [GB] United Kingdom ............... 8416454

[51] Int. Cl.$^4$ .................... C08F 6/24; C08L 1/26; B01F 17/52
[52] U.S. Cl. ........................ 524/35; 524/44; 524/45; 524/46; 524/47; 524/555; 524/556; 524/612; 524/916; 528/499; 528/502; 210/698; 210/701; 252/315.3; 252/315.4
[58] Field of Search ............. 528/491, 499, 502; 524/580, 777, 916, 555, 556, 612, 35, 44–47; 210/701, 698; 252/315.3, 315.4

[56] References Cited

U.S. PATENT DOCUMENTS

| | | | |
|---|---|---|---|
| 3,755,280 | 8/1973 | Saunders | 210/734 X |
| 3,876,573 | 4/1975 | Engelhardt et al. | 210/734 X |
| 3,960,584 | 6/1976 | Savage | 210/734 X |
| 3,976,611 | 8/1976 | Aloia | 524/777 X |
| 3,985,651 | 10/1976 | Newman | 210/734 |
| 4,380,600 | 4/1983 | Hosoda et al. | 524/458 |
| 4,487,866 | 12/1984 | Almond et al. | 524/42 |
| 4,517,098 | 5/1985 | Hann et al. | 210/701 |
| 4,525,515 | 6/1985 | Peignier | 524/378 |
| 4,559,156 | 12/1985 | Greaves et al. | 210/701 X |

*Primary Examiner*—Joseph L. Schofer
*Assistant Examiner*—F. M. Teskin
*Attorney, Agent, or Firm*—Jenner & Block

[57] ABSTRACT

A water soluble or swellable polymer gel is dispersed into a liquid phase to form a fluid composition and is worked while in that composition. The liquid phase is an aqueous solution of an equilibrating agent that substantially prevents aggregation of the particles or dissolution of the polymer during the working. The working may be, for instance, milling, extraction of impurities, extraction of water, transportation or chemical modification. Preferred equilibrating agents are sodium polyacrylate and polydiallyl dimethyl ammonium chloride.

21 Claims, No Drawings

PROCESS FOR DISPERSING POLYMER GEL PARTICLES IN AQUEOUS MEDIUM

There are numerous instances where it is desirable to subject water soluble or water swellable polymers to some working operation. Examples of such working operations include comminuting the polymer, reducing the water content of polymer gel, removing impurities from the polymer, chemically modifying the polymer by chemical reaction, and transporting the polymer, for instance from one part of a manufacturers plant to another.

It is possible to conduct some, but not all, of these operations on the polymer while it is in powder form but this necessitates that the polymer shall first have been converted to a powder and it has the disadvantage that the powder is often dusty, creating handling problems.

It is possible to conduct some, but not all, of the working operations whilst the polymer is present as an aqueous solution but this has the disadvantage that very large volumes have to be handled as water soluble polymers, especially high molecular weight polymers, tend to give very high solution viscosities and so the solution concentration has to be low.

It is possible to conduct some, but not all, of the working processes whilst the polymer is dispersed in oil or other suitable non-aqueous liquid but this has the disadvantage that the polymer is then contaminated with the non-aqueous liquid.

A particular problem arises when the workig involves conversion of a rigid aqueous gel of the polymer into particles. It is standard practice to divide the rigid gel into granules and then comminute the granules to the desired particle size and dry the particles.

The comminution and drying is normally effected by one of two methods. In one method, typified by the process described in U.S. Pat. No. 3,714,136, the gel granules, optionally after partial drying, are cut in air to the desired particle size (in one or more stages) and are dried in air. In another process that is applicable to some polymers, the gel granules are milled in excess methanol in one or more stages and the resultant particles are separated from the methanol.

The method involving comminution in air has the advantage that it is simple and relatively quick to operate, does not involve handling organic solvents and is applicable to substantially all gel polymers. It has the disadvantage that it can give a rather wide range of particle sizes, involves relatively high energy costs and can cause heating of the gel particles which may in some instances deleteriously affect the particles or the polymer, and the particles may agglomerate. The method involving comminution in methanol avoids or minimises some of these disadvantages and has the advantage that it results in some extraction from the gel of unwanted impurities, as well as water. However the process is inconvenient to operate and incurs the serious disadvantage of the need to handle and recover toxic, flammable solvent and involves large loss of solvent.

The particles obtained by either method swell and/or dissolve upon contact with water. Unless known precautions are taken there is a tendency for the particles temporarily to form an agglomerated mass upon initial contact with the water.

To facilitate dissolution into water without agglomeration it is known to make a liquid dispersion of dry polymer in a non-aqueous liquid. In one method polymer powder, for instance made by one of the methods described above, is milled in a glycol so as to form a substantially stable dispersion of the dry polymer particles in the glycol. Such a process is described in U.S. Pat. No. 3,985,651. In U.S. Pat. No. 4,118,355 dry polymer is dispersed in one or a blend of water immiscible solvents (e.g., methanol and a glycol ether) in which it is insoluble but it dissolves in the presence of water.

Other methods of facilitating dissolution of polymer particles into water involve polymerisation of aqueous monomer in a non-aqueous liquid, optionally with dehydration of the resultant dispersion, and the distribution of that dispersion into dilution water in the presence of an oil in water emulsifier. However this results in the dilution water being contaminated with the non-aqueous liquid, and also with the emulsifier.

It has been proposed in U.S. Pat. No. 4,380,600 to make a dispersion of water soluble polymer, that is said to be present as microscopic particles, in aqueous media by polymerisation in the presence of an aqueous solution of defined, different, water soluble polymers, the amounts of water, monomer to form the particles of polymer, and dissolved polymer being within defined limits. As the particles of polymer are said to be microscopic the particle size presumably is, at the most, only a few microns. The dispersed polymer must be chemically different from the dissolved polymer and so the process is only applicable to the production of products based on chemically different polymer types. Although U.S. Pat. No. 4,380,600 mentions the possibility of using a wide variety of dissolved polymers in practice all the examples except two stabilise the system using solely a non-ionic dissolved polymer. The exceptions are example 5 where a dissolved blend of polyethylene imine and non-ionic polymer is used to stabilise cationic particles and example 9 where a blend of dissolved non-ionic and anionic polymer is used to stabilise cationic particles.

U.S. Pat. No. 4,380,600 however does not contribute to a solution of the existing major problem, namely the problem of improving the methods of working pre-formed water soluble or water swellable high molecular weight polymer. Such pre-formed polymers may have been made by established techniques that have been otpimised over the years, such as gel polymerisation, and so would be expected to have properties far superior to the properties made by the new polymerisation process of U.S. Pat. No. 4,380,600.

In the invention a water swellable or water soluble high molecular weight polymer is dispersed into a liquid phase to form a fluid composition comprising the polymer in the form of gel particles interconnected by the liquid phase and the polymer is worked while present as the fluid composition, and the process is characterised in that the gel particles have a size during the working greater than 20 microns and the liquid phase is an aqueous solution of an equilibrating agent that substantially prevents aggregation of the particles or dissolution of the polymer during the working.

Thus in the invention polymer can be made by established techniques and the pre-formed polymer is then converted into the form of the fluid composition and subjected to the working processes whilst in this form. The equilibrating agent prevents aggregation of the particles or dissolution of the polymer during the working to the extent necessary to permit the working to be conducted without the polymer particles being converted to a viscous solution or an agglomerated rubbery mass. The equilibrating agent may result in the aqueous solution being, eventually, in total equilibrium with the aqueous medium so that the fluid composition has prolonged stability. However total stability in this manner is not necessary provided stability does prevail during the working process. The working process generally involves agitation of the fluid composition and so any tendency for the individual particles to stick to one another during the working can be prevented by this agitation. The working process may only last a few seconds or minutes and so even though there may be a tendency towards aggregation or dissolution of the polymer this is not a serious factor during the short working period.

Conventional stabilization of dispersions of polymer particles in water usually requires a stabiliser that acts by increasing the viscosity of the water significantly and/or by forming a water insoluble film around the particles to keep them separate from one another. It appears that the equilibrating agent does not work by one of these mechanisms although it is possible that a film of equilibrating agent may form around each gel particle to keep the particles separate from one another and flowable with respect to one another during the process. The equilibrating agent must result in the gel and the aqueous medium being held in substantial equilibrium, i.e., without serious dissolution or aggregation, during the process. The equilibrating agent may maintain the initial water contents of the aqueous solution and the gel, so as to prevent any substantial net transfer into or out of the gel and for many purposes the polymers and equilibrating agents should be selected such that the net transfer of water is not more than 25%, preferably not more than 10% and most preferably not more than 3% by weight of the gel. However if the polymer is introduced into the gel as dry particles they will equilibrate with the aqueous medium to form rigid gel particles which will then be in substantial equilibrium with the aqueous medium. A particularly preferred process is one in which the equilibrating agent is such that there is net transfer of water from the gel into the aqueous medium, the amount of water transferring from the gel being up to, for instance, 40 or even 50%, and sometimes more, by weight of the gel that is introduced into the fluid composition.

At some stage during the working, the gel particles have a size of at least 20 microns. Often they have such a size at the end of the working operation but they may be comminuted during the working to a size less than 20 microns. Often the particle size at the end of the working operation (and at the start of the operation if there is no size reduction during the working) is at least 50 microns and usually at least 100 microns. It may be up to, for instance, 5 mm but is generally below 2 or 3 mm with the average particle size often being in the range 200 microns to 2 mm, typically 0.5 to 1 mm. The proportions of fluid medium and particles are preferably such that the gel particles appear to be substantially in contact with one another, being separated by a film of the aqueous medium, and generally the amount of aqueous medium is insufficient for the particles to appear to separate totally from one another, as in conventional dispersions.

A preferred working method of the invention comprises milling the gel particles whilst in the fluid composition and then separating the milled gel particles from the aqueous medium.

The milling of the gel in aqueous medium can be effected by, for example, passing very large pieces of gel in the presence of the aqueous medium into suitable milling apparatus. For instance slabs or blocks of gel 500 mm or more in size may be forced with aqueous medium into and through an extruder and chopper that reduces the gel to the desired particle size. Usually however a fluid dispersion is formed initially of gel granules in the aqueous medium and this dispersion is then milled by any convenient apparatus for milling aqueous dispersions. A suitable apparatus is an in-line Silverson mixer. The milling may be effected in a single pass through the mixer or the suspension may be passed through two or more mixers in series or through one mixer two or more times. The milling conditions are preferably selected in known manner such that the milled gel particles have a gel particle size below 5 mm and most preferably in the range 0.1–3 mm.

The aqueous gel granules are generally fragments obtained by fragmentisation of a mass of rigid aqueous gel, for instance as obtained by bulk aqueous gel polymerisation. This fragmentisation may be conducted in conventional manner, for instance by cutting a mass of gel into pieces and/or by extruding a mass of gel through coarse orifices, optionally cutting the gel before or after the extrusion. The fragments or other granules generally have a particle size of at leat 1, 2 or 3 mm, and normally at least 5 mm, and may be as large as 200 mm or more, particle sizes in the range 5 to 100, preferably 5 to 30 mm being typical.

Instead of introducing the polymer in the form of rigid aqueous gel it can be introduced as, for instance previously dried granules which are added to the aqueous medium in dry form, whereupon they will equilibrate with the medium to form rigid aqueous gel granules. The dry granules may be obtained by, for instance, bead polymerisation in a non-aqueous liquid or by sieving oversized particles from a powdered polymer made by any convenient method. Thus the milling method of the invention has the advantage that it can either be used as the primary production technique for powdered polymer or as a way of converting to lower particle size coarse particles made by some other technique. Similarly polymer that is to be worked in some other manner, e.g., chemical reaction, may be introduced as gel or dry particles. Other ways of making the starting polymer particles include precipitation polymerisation, emulsion or dispersion polymerisation with coagulation and optionally drying, and spray drying a polymer emulsion or dispersion.

The dispersion of the granules in the aqueous medium does not have to be wholly stable but must remain fluid and so if there is a tendency for the granules to separate from the dispersion the dispersion must either be milled sufficiently quickly after formation that there is no serious settlement or the dispersion must be stirred to prevent settlement or the granules, if they settle, must be capable of being readily redispersed into the dispersion by agitation. Similarly the milled dispersion need not be fully stable provided the particles are separated from it before serious settlement occurs.

The milled gel particles may then be separated from the aqueous medium by centrifuging or other convenient filtration or separation process and may then be dried. Although drying is generally conducted in direct contact with warm air, e.g., 20 to 90, often to 30° to 70° C., for instance in a fluidised bed it can also be conducted by other methods. For instance the separated particles may be dispersed into a suitable non-aqueous liquid and then may be dried by azeotroping, generally under reduced pressure. Often the dispersion in the non-aqueous liquid is sufficiently stable, due to the presence of the equilibrating agent on the particles, that it can be azeotroped without providing additional stabiliser, but if necessary conventional, generally water insoluble, polymeric stabiliser or other dispersing agent may be added to increase stability during the azeotroping.

The milling conditions can easily be selected such that the resultant powder has a dry particle size within a range of, for instance 75 microns to 4.5 mm, preferably 250 microns to 2.5 mm. The product can be substantially free of dust.

A particular advantage of the invention is that it is possible, for the first time, to produce a milled product having a very narrow spread of particle sizes and, in particular, that is free of dust. Conventional dry grinding of gel polymer inevitably produces a lot of dust. Milling in organic liquids such as methanol incurs toxicity and flammability problems and milling in, for instance, polyhydric alcohols can additionally incur the risk of cross linking the particles. By the process of the invention all these disadvantages are avoided and it is possible to obtain a product having a novel and narrow spread of particle sizes. Thus it is possible to make a product that is substantially free of particles below 150 microns and is preferably substantially free of particles below 500 microns. For instance less than 2% by weight may be below 150 microns and less than 5%, most preferably less than 2%, by weight below 500 microns. The majority of the product may be less than 2 mm, for instance with at least 20% by weight being from 500 microns to 1 mm and at least 20% by weight from 1 mm to 2 mm. As a result of eliminating the small particles, below 150 microns, the free flow properties of the dried product is improved and the risk of agglomeration upon mixing the particles with water is reduced.

Another advantage of the process is that the particles tend to be more regularly shaped than conventional air ground particles.

Another working process that can be conducted in the invention comprises partially drying the gel by holding the gel particles in the aqueous medium and using as the aqueous medium a solution that draws water out of the gel particles, and then separating the dry particles from the gel. They may thereafter be dried in air or by azeotroping, as discussed above. They are generally held in the aqueous medium whilst stirring so as to promote contact between the gel and the aqueous medium. Preferably the stirring involves milling and so the reduction in water content of the gel may occur during the milling process described above.

For instance we have found surprisingly that aqueous low molecular weight sodium polyacrylate solution generally containing 15 to 55% preferably 25 to 45% sodium polyacrylate can take substantial amounts of water out of gel particles of substantially non-ionic or slightly anionic polyacrylamide or copolymers of acrylamide with up to, for instance, 50% by weight sodium acrylate and so this affords a convenient way of increasing the solids content of the gel before having to evaporate water from the gel. Similarly the solids content of a cationic polymer gel, for instance of dialkyl amino alkyl acrylate or methacrylate, generally as a copolymer with acrylamide, can be incresed using a suitable cationic polymer, generally diallyl dimethyl ammonium chloride in aqueous solution as the equilibrating agent, the solution generally containing from 10 to 50%, preferably 15 to 30%, by weight of the dissolved polymer. Similar drying effects are obtainable with other anionic high molecular weight polymers, such as copolymers with other ethylenically unsaturated carboxylic or sulphonic acids, and with other cationic polymers. Polymers to be dried by this technique are preferably formed from 40 to 100% non-ionic monomers and 0 to 60% by weight ionic monomers.

Another working process according to the invention comprises extracting water soluble impurities from the gel by holding the particles in the aqueous medium. Again it is preferred to stir the particles during the extraction and this stirring is again conveniently provided by milling as described above. Best extraction occurs when there is a net transfer of water out of the gel particles into the aqueous medium and so preferably the extraction occurs whilst partically drying the gel particles, as described above. By the invention it is possible to obtain polymer having much lower impurity levels than are commercially available. When extracting impurities or dehydrating a gel the working is often conducted for 10 to 60 minutes or longer, typically about 30 minutes, generally after a milling step.

Another working method comprises flowing the fluid composition from one point to another. For instance it may be pumped through a piper or other suitable duct. This working process is of particular value for transporting the polymer gel particles from one point, for instance where they are initially made as granules described above, to another point where they are, for instance, centrifuged and dried.

Another working process according to the invention comprises subjecting the polymer to chemical modification while the particles are in the aqueous medium. The chemical modification is normally conducted while stirring the particles in the aqueous medium. Suitable modifications that may be conducted include hydrolysis (for instance by incorporating sodium hydroxide in the aqueous medium when the gel polymer is polyacrylamide) Hofman degradation, sulphomethylation or Mannich substitution, all using known reaction mechanisms.

Another working process of the invention involves dispersing the particles, usually after milling as described above, into a non-aqueous liquid so as to form a stable dispersion, with or without oil in water surfactant to facilitate distribution of the dispersion into water. Conventional dispersion stabiliser may be included if desired. The gel particles may need to be milled to, for instance, to below 10 microns to increase stability.

An advantage of the invention is that the gel particles obtained in the process generally have a coating of 1–20%, generally 2 to 10% dry weight, of equilibrating agent on them and this coating is more uniform than is obtainable by any other technique, such as spraying, and the coating can be very beneficial. For instance a coating of a water soluble ionic polymer on gel polymer particles facilitates the individual dissolution or distribution of the particles into an aqueous medium.

The gel must be a rigid aqueous gel. By saying that it is rigid we mean that it has sufficient rigidity that it can be worked without risk of these particles flowing into one another and generally has characteristics typical of gels that are air comminuted at present. Normally the viscosity of the gel is 200,000 cps at 25° C. The gel normally consists substantially only of polymer and water, the polymer content generally being at least 10% and preferably at least 25% by weight and generally being below 50 or 60%, and preferably below 45% by weight, these percentages being based on the weight of polymer and water. However the gel may include other components physically mixed into it, for instance inorganic salt as described in European patent application No. 84302555.2.

The gel polymers are formed from water soluble monomers or water soluble blends of monomers by gel polymerisation or by any other convenient way of making soluble or swellable polymers. The polymers are usually water soluble but they may instead be only water swellable, for instance as a result of including cross-linking agent in the monomers. They normally have high molecular weight, generally above 0.5 million, preferably above 1 million, for instance 5 to 30 million. They are useful as, for instance, viscosifiers and flocculants.

It is generally necessary to use of at least 0.5 parts, and normally at least 1 part by weight aqueous medium per part by weight of aqueous gel (i.e. based on the weight of polymer and water in the gel particles). The amount is normally below 10 parts, with convenient results generally being achieved with from 1.2 to 5, preferably around 2, parts by weight aqueous medium per part by weight aqueous gel. Expressed alternatively, the amount of aqueous medium is generally 1.5 to 30, preferably 3.6 to 15, parts by weight per part by weight polymer in the gel. If the amount is too low the benefits of working in the aqueous medium may be lost and the worked dispersion (and if appropriate, the initial dispersion of granules) will not flow and will be difficult to handle. If initially dry granules are used, larger amounts of aqueous medium must be provided in order that, after equilibration, the desired amount of aqueous medium remains outside the gel particles.

Equilibration is normally substantially complete before working but need not be and the worked particles can initially have a water content significantly below their equilibrium water content.

The choice of equilibrating agent is determined by the nature of the polymer. A phenomenon similar to osmosis may be utilised in the invention since if the ionic concentration in the aqueous medium is appropriate having regard to the ionic concentration of the gel granules or particles there may be little or no tendency for water to transfer from one phase to the other. However the polymer particles will have an inherent tendency to attract water, for instance by hydrogen bonding, irrespective of the ionic state and so the equilibrating agent may not be capable of being selected solely on the basis of conventional osmosis considerations.

For instance although it is known that certain inorganic salts can be used in high concentrations to dehydrate aqueous gels, in the invention it is generally found that the use of inorganic salts alone as the equilibrating agent is ineffective to prevent the polymer gel taking water from the aqueous medium to such an extent that the gel swells unacceptably and aggregates or dissolves during the process. However some strongly ionic inorganic salts, are sometimes usable alone with certain gel polymers, for instance ammonium sulphate is suitable as the equilibrating agent for a non-ionic polymer such as polyacrylamide.

Preferably the equilibrating agent comprises a dissolved polymer, sometimes in combination with a dissolved inorganic salt. This water soluble salt may be introduced as a component of the gel, with consequential leaching from the gel granules into the aqueous medium, but often is deliberately added to the aqueous medium with the water soluble polymer, separate from the gel granules.

If the gel polymer is ionic the dissolved polymer preferably is co-ionic but in some instances may be counter-ionic, especially if inorganic salt is included in the equilibrating agent. The inclusion of inorganic salt is also useful as a way of reducing the amount of co-ionic polymer in solution that is required to give appropriate equilibration. Any salt or other equilibrating aget should be chemically inert during the process. For instance it should not undergo unwanted hydrolysis.

Generally non-ionic equilibrating agents are not very satisfactory for use with ionic polymers. If the high molecular weight polymer is non-ionic (especially polyacrylamide, cellulosic or starch polymers) then the equilibrating agent can be selected from anionic, non-ionic and cationic materials.

In one preferred process the high molecular weight polymer is anionic and the equilibrating agent comprises dissolved anionic polymer or possibly cationic polymer or anionic surfactant.

In another preferred process the equilibrating agent is polydiallyl dimethyl ammonium chloride, the high molecular weight polymer preferably being cationic but also possibly being anionic or even non-ionic.

In another preferred process the equilibrating agent comprises a dissolved ionic polymer in an amount of at least 0.3 and generally at least 0.5 parts per part dry weight of the high molecular weight polymer.

In another preferred process the equilibrating agent comprises a dissolved polymer formed from at least one monomer that is the same as a monomer from which the high molecular weight polymer is formed, the equilibrating polymer and high molecular weight polymer preferably being homopolymers of the same monomer or copolymers formed from the same monomers, either in the same or different proportions.

In addition to selecting an appropriate material or mixture of materials for use as the equilibrating agent it is also necessary to select an amount of these materials to provide the desired effect. For instance if appropriate equilibration is obtained at one concentration of the chosen material or blend of materials it will be found that upon reducing this concentration sufficiently equilibration will be lost and a viscous solution or rubbery mass of gel particles will be obtained, instead of the desired discrete rigid gel particles.

The aqueous medium should have low-viscosity and in particular will generally have a viscosity below 20,000 cps at 25° C., most preferably below 10,000 cps at 25° C., and so the equilibrating agent should not cause a substantial increase in the viscosity of the aqueous medium. Any polymer that is dissolved in the aqueous medium must therefore be of relatively low molecular weight, and will generally have a molecular weight below 500,000, often below 100,000, if cationic or non-ionic. Anionic dissolved polymers should normally have a molecular weight below 20,000 and preferably below 10,000 and most preferably below 5,000.

Suitable high molecular weight anionic polymers that can be utilised in the invention are water soluble or swellable salts of polymers of acrylic acid, methacrylic acid or acrylamido methyl propane sulphonic acid (AMPS) or other ethylenically unsaturated carboxylic or sulphonic acids optionally copolymerised with each other or with non-ionic ethylenically unsaturated, generally acrylic, monomers such as acrylamide.

With such gel polymers the preferred equilibrating agents are dissolved anionic polymers, preferably homopolymers of sodium acrylate or acrylamido methyl propane sulphonic acid (AMPS) sodium salt or other salts or other anionic monomer, and copolymers with monomers that do not render the polymer ineffective. The solution typically is an aqueous solution of 15 to 55%, preferably 30 to 45%, by weight. Instead of using the dissolved polymer alone the required concentration can be reduced by the addition of an inorganic salt, such as sodium sulphate.

Some cationic polymers can be used as equilibrating agents for the anionic gel polymers, especially in the presence of inorganic salt. For instance poly-diallyl dimethyl ammonium chloride (poly DADMAC) can be used typically as an aqueous solution of 10 to 50%, preferably 15 to 30%, by weight and polyvinyl pyridine salts. Non-ionic polymers are generally found to be ineffective with gel anionic polymers although adequate results are obtainable using polyvinyl pyrrolidone and polyethylene glycol and N-vinyl-N-methyl acetamide but some others tend to be unsuitable.

Suitable high molecular weight cationic polymers that can be used in the invention are polymers of DADMAC, vinyl pyridine, methacrylamidopropyl trimethyl ammonium chloride (MAPTAC) and dimethylaminopropyl methacrylamide acid salts (DMAPMA) but, most preferably, are salts or quaternary salts of dialkylaminoalkyl-methacrylates, -acrylates or -acrylamides, optionally copolymerised with other acrylic or ethylenically unsaturated monomers, generally non-ionic monomers such as acrylamide. Suitable equilibrating agents for these cationic polymers include dissolved cationic polymers such as poly-DADMAC or other quaternary polymeric salts, polyvinyl pyridine salts, polyethylene imines and certain anionic polymers, especially when mixed with salt. Non-ionic polymers are again generally unsatisfactory.

The preferred non-ionic high molecular weight polymer that is used in the invention is polyacrylamide but others than can be used include polyvinyl pyrrolidone, hydrolysed polyvinyl acetate N-vinyl N-methyl acetamide or formamide. As equilibrating agents there are preferably used a variety of dissolved anionic polymers such as those discussed above, for instance sodium polyacrylate, or cationic polymers, for instance poly DADMAC. Some non-ionic polymers can be used in some instances, for instance polyethylene glycol (molecular weight preferably 10,000 to 30,000, preferably 20,000) and polyvinyl pyrrolidone. Generally there is no advantage in including an inorganic salt when stabilising a dispersed non-ionic polymer.

All synthetic polymers used in the invention are preferably formed from ethylenically unsaturated monomers, generally acrylic monomers.

The dispersed gel polymers can be natural or modified products, instead of the synthetic polymers discussed above. For instance they can be non-ionic or anionic and can be cellulose derivatives such a methyl cellulose or hydroxy ethyl cellulose or sodium carboxymethyl cellulose. Starch derivatives may be used, for instance a starch acrylamide and/or sodium acrylate product. For these products the preferred equilibrating agents are dissolved anionic polymers, particularly sodium acrylate.

Instead of using water soluble polymers as equilibrating agents it is also possible to use equivalent water soluble surfactants in similar amounts. Thus instead of using anionic polymer an anionic surfactant may be used, for instance a phosphate or sulphate of a long chain, generally linear, aliphatic alcohol, generally containing 8 to 22 carbon atoms. Instead of using a cationic polymer it is possible to use a cationic surfactant such as a quaternary ammonium compound. Suitable compounds that may be used include benzyl trimethyl ammonium chloride and compounds containing at least one, and generally at least two long chain aliphatic groups, for example di coco dimethyl ammonium chloride. Non-ionic surfactants that can be used include alkyl phenol ethylene oxide condensates such as nonyl phenyl ethylene oxide condensate. All such surfactants are present in aqueous solution in relatively high concentrations, for instance above 10% and often above 20% by weight of the water plus surfactant.

Blends of polymers and/or surfactants may be used as equilibrating agent, any blend preferably being co-ionic. Thus a blend of anionic polymers or of cationic polymers or of non-ionic polymers may be used, but preferably not a blend of, for instance, non-ionic and cationic polymers.

If salt is used as part of the equilibrating agent the amount is generally from 0.3 to 5, most preferably 0.5 to 2, parts by weight per part by weight dissolved polymer. If the equilibrating agent can either be a dissolved polymer by itself or a blend of that dissolved polymer with salt the amount of salt used in the blend is generally from 1 to 3 parts, generally about 2 parts, by weight salt per part by weight of the dissolved polymer that is replaced by the salt. For instance if the equilibrating agent can conveniently be 100 grams dissolved polymer similar results may be obtainable with 50 grams dissolved polymer and 100 grams of the salt.

If inorganic salt is used, it is usually an alkali metal or ammonium salt, often a sulphate or halide. The preferred material is sodium sulphate but others that may be used include ammonium sulphate and sodium chloride. In general any material that will ionise in the aqueous medium can be used provided it does not deleteriously affect the gel polymer or any solution polymer in the dispersion and provided it is commercially acceptable in the final powder.

The concentration of dissolved equilibrating agent in the aqueous medium will generally be above 10% by weight but below 70% and usually below 60%. If used by itself the amount is generally at least 20%, and usually at least 30%, for instance up to 50%, by weight of the aqueous medium but if used as a blend with a salt it may be less, for instance at least 15% by weight of the medium. The amount of the salt, if present, is generally at least 10%, typically 15 to 30%, by weight of the medium.

The ratio by dry weight of high molecular weight polymer to equilibrating agent is generally from 1:0.3 (generally 1:0.5) to 1:10, most preferably 1:1 to 1:4, these values being particularly applicable when the equilibrating agent consists of dissolved polymer.

The process is generally conducted without external heating, although the gel may initially the warm and the working may generate some heat. Normally the fluid dispersion of gel granules is milled or otherwise worked substantially immediately it is formed and the worked particles are generally separated from the dispersion substantially immediately after working, so that any instability or swelling or dissolution of the polymer gel during prolonged contact with the aqueous medium is minimised.

The milling process of the invention has the advantage that it is easy and quick to carry out, does not require the high energy and involve the risk of overheating associated with comminution in air and does not involve the solvent handling problems associated with comminution in methanol. It has the particular advantage that it can easily be operated to give a powder of a relatively narrow particle size range, and in particular a powder substantially free of dust. An important advantage of the invention is that the process can result in a major reduction in the content of water soluble impurities in the polymer powder, compared both to the impurity levels obtained when the gel is comminuted in methanol and, especially, when it is comminuted in air. Thus by the invention it is possible to achieve gels having extremely low contents of unpolymerised monomer and of water soluble impurities. Also the powder particles obtained in the invention have a coating of the equilibrating agent and this can cause beneficial effects, depending upon the choice of equilibrating agent. For instance a coating of low molecular weight polymer can assist subsequent dispersion of the dried polymer particles into water. Also the inclusion of low molecular weight polymer with high molecular weight polymer can give improved performance properties. Conversely, if the low molecular weight polymer is counter-ionic to the high molecular weight polymer there can, in some instances, be a reduction in performance properties and so this is an additional factor that should be had in mind when selecting the equilibrating agent for any particular gel polymer.

In commercial operation of the process it is convenient to reuse the aqueous medium resulting from the separation of the milled or otherwise worked gel particles from the aqueous medium, with any required replenishment of water or polymer or removal of monomer or other extracted impurities. In the preferred processes in which there is substantially no transfer of water between the aqueous medium and the gel particles substantially the only replenishment required will be replacement of equilibrating agent that is coated onto the gel particles. A preferred method according to the invention comprises slurrying gel particles into the aqueous medium, passing this slurry through one or more Silverson in-line mixers or other appropriate mills, separating the milled particles from the aqueous medium by centrifuging or otherwise filtering the milled slurry, drying the separated particles by fluidised bed or other convenient air drying, and recycling the separated aqueous medium, with appropriate replenishment of water and/or equilibrating agent and possible removal of impurities, to the initial slurrying stage.

In the following examples, Example 1 demonstrates a process according to the invention and Examples 2 and 3 show the effect of carrying out a similar process with various combinations of gel polymers and equilibrating agents.

EXAMPLE 1

A copolymer of 55 parts by weight sodium acrylate and 45 parts acrylamide having intrinsic viscosity of 20 was formed by conventional aqueous gel polymerisation as a mass of aqueous gel having 33% by weight solids content (67% by weight water).

1,000 grams of this gel were diced into cubes having dimensions of approximately 10 mm and these cubes were stirred into 2,000 grams of a 40% by weight solution of sodium polyacrylate having an average molecular weight about 3,500. The resultant slurry was passed through an in-line Silverson mixer fitted with an emulsor screen and then through a series of 1,000 micron, 500 micron and 250 micron sieves. The sodium polyacrylate solution was recycled to the container in which the slurry was formed. The gel collected on the 1,000 micron sieve (which accounted for at least 99% of the solids retained on the sieves) was centrifuged in a basket centrifuge at about 5,000 revolutions per minute. The resulting centrifuged gel crumbled readily and was then dried in a fluid bed dryer at 65° C. for about 30 minutes. Analysis of the aqueous medium before slurrying with the gel and after separation from the milled dispersion showed that the concentration of sodium polyacrylate had fallen by about 2% and since some polyacrylate was coated on the dried particles this indicated substantially no transfer of water between the aqueous medium and the gel particles.

The resulting powder was labelled A. As a comparison powder B was made by comminuting another sample of the same gel in methanol followed by separation of the methanol and another product, labelled C, was made by comminuting the corresponding gel in air followed by fluidised drying in conventional manner. The content of acrylic acid, acrylamide, ethylene cyanohydrin and beta-hydroxy propionamide in each of the products was determined by gas liquid chromatography. The results are shown in Table 1 below, as percentages by weight based on the weight of polymer.

TABLE 1

| Product | Acrylic Acid | Acrylamide | Ethylene cyanohydrin | Beta-hydroxy propionamide |
|---|---|---|---|---|
| A | 0.435 | 0.013 | 0.118 | 0.10 |
| B | 0.454 | 0.019 | 0.149 | 0.14 |
| C | 0.718 | 0.042 | 0.396 | 0.32 |

These results demonstrate the very low impurity level, and in particular the low level of ethylene cyanohydrin, obtainable by the process of the invention compared to the known processes.

EXAMPLE 2

The process of Example 1 was repeated with other aqueous media with the results shown in Table 2.

In this Table the following abbreviations are used
SA—sodium acrylate polymer
SMA—sodium methacrylate polymer
ACM—acrylamide polymer
PVP—polyvinyl pyrrolidone
PEG—polyethylene glycol
AMPS—sodium acrylamido-2-methyl propane sulphonic acid
PVA—polyvinyl alcohol
NVNMA—N-vinyl-N-methyl acetamide polymer
DADMAC—diallyl dimethyl ammonium chloride polymer
QDMAEMA—quaternised dimethylaminoethyl methacrylate polymer
MeCl—methyl chloride
QDMAEA—quaternised dimethylaminoethyl acrylate polymer
DMS—dimethyl sulphate
SS—sodium sulphate The proportions of monomers used in the identified copolymers are by weight.
The following results were obtained.

TABLE 2

| | AQUEOUS MEDIUM | OBSERVATION OF FLUID MILLED DISPERSION |
|---|---|---|
| 1 | 40% SA, Mw 3,500 | No swelling |
| 2 | 30% SA, Mw 3,500 | No swelling |
| 3 | 20% SA, Mw 3,500 | Some swelling |
| 4 | 10% SA, Mw 3,500 | Reject - rubbery gel |
| 5 | 20% SA, Mw 3,500 + 20% SS | No swelling, some crystals |
| 6 | 20% SA, Mw 3,500 + 10% SS | No swelling, some crystals |
| 7 | 15% SA, Mw 3,500 + 20% SS | No swelling, some crystals |
| 8 | 15% SA, Mw 3,500 + 15% SS | Reject - dissolves to form gel |
| 9 | 40% 20-isobutylmethacrylate/80-SA Mw 4,000 | No swelling |
| 10 | 30% PVP | Slight dissolution |
| 11 | 27% PEG, Mw 20,000 | No swelling |
| 12 | 40% 20-AMPS/80-SA, Mw 3,083 | No swelling |
| 13 | 40% 40-AMPS/60-SA, Mw 4,421 | No swelling |
| 14 | 40% ACM | Reject - dissolves |
| 15 | 40% 20-Methylacrylate/80-SA | Reject - dissolves |
| 16 | 25% PVA | Reject - dissolves |
| 17 | 25% PVA + 15% SS | Reject - PVA precipitates |
| 18 | 25% PVA + 15% PEG Mw 20,000 | Reject - dissolves to form gel |
| 19 | 30% NVNMA | Dissolves on prolonged standing |
| 20 | 40% SA, Mw 4,120 | No swelling |
| 21 | 40% SA, Mw 1,743 | No swelling |
| 22 | 40% 95 SA, 5 PEG, Mw 20,000 | No swelling |
| 23 | 40% 75 SA, 25 PEG, Mw 20,000 | No swelling |
| 24 | 40% 50 SA, 50 PEG, Mw 20,000 | Slight swelling |

From this it is apparent that 4, 8, 14, 15 to 18 were inoperable, 3, 10, 19 and 24 were operable provided the process was conducted carefully and quickly, and the others were satisfactory.

EXAMPLE 3

The process of Example 1 was repeated but using various gel polymers and aqueous media with the results shown in Table 3.

TABLE 3

| | GEL POLYMER | AQUEOUS MEDIUM | OBSERVATION OF FLUID MILLED DISPERSION |
|---|---|---|---|
| 1 | SA (IV12) | 40% SA, Mw 3,500 | Gels on prolonged standing |
| 2 | SA (IV12) | 40% DADMAC, Mw 80,000 | No swelling |
| 3 | 50 AMPS-50 ACM (IV10) | 40% SA, Low Mw | No swelling |
| 4 | 50 SMA-50 ACM (IV6) | 40% SA, Low Mw | No swelling |
| 5 | 30.6% ACM (IV16) | 40% SA, Mw 3,500 | No swelling |
| 6 | 30.6% ACM (IV16) | 40% DADMAC, Mw 60,000 | No swelling |
| 7 | 30.6% ACM (IV16) | 40% PEG, MW 20,000 | No swelling |
| 8 | 30.6% ACM (IV16) | 25% PVA | Swells on standing |
| 9 | 30.6% ACM (IV16) | 30% PVP | No swelling |
| 10 | 35% 53 QDMAEA MeCl/47 ACM (IV13) | 40% DADMAC, Mw 80,000 | No swelling |
| 11 | 35% 53 QDMAEA MeCl/47 ACM (IV13) | 30% QDMAEMA MeCl | Slight swelling |
| 12 | 35% 53 QDMAEA MeCl/47 ACM (IV13) | 20% QDMAEA DMS* | Reject - dissolves |
| 13 | 32% 4 QDMAEA-MeCl/96 ACM (IV7) | 40% DADMAC | No swelling |
| 14 | 35% 20 DADMAC/80 ACM (IV8) | Aqueous Polyethyleneimine | No swelling |
| 15 | 50% QDMAEA MeCl (IV6) | Aqueous Polydimethylamine epichlorhydrin | No swelling |
| 16 | 35% 30 MAPTAC/70 ACM (IV8) | Aqueous DADMAC, Low Mw | No swelling |
| 17 | 35% 30 DMAPMA ½ H₂SO₄/70 ACM (IV6) | Aqueous DADMAC, Low Mw | No swelling |
| 18 | 25 SA 75 ACM | 60% 2-ethyl hexyl sulphate | No swelling |

*A 20% solution of these polymers had a viscosity of 5,000 CPS

All of these except 12 were operable but it was desirable to complete processes 1, 8 and 11 relatively quickly.

EXAMPLE 4

Copolymers of varying proportions of sodium acrylate and acrylamide, possibly contaminated with trace amounts of sodium acrylate, were made by conventional gel polymerisation as a mass of aqueous gel. 1,000 grams of the aqueous gel was comminuted in 2,000 grams of a 40% by weight solution of sodium polyacrylate having an average molecular weight of about 3,500 using an in-line Silverson mixer. The resultant slurry was allowed to stir for ½ hour during which time water transfer from the gel into the sodium polyacrylate had reached an equilibrium. The slurry was centrifuged in a basket centrifuge at about 5,000 rpm. The resulting centrifuged gel was analysed for solids content. The increase in solids content of the gel particles was recorded. The results are given in Table 4.

TABLE 4

| Wt Ratio SA:AMC | IV | Solids Content of gel % | | |
|---|---|---|---|---|
| | | Before | After | Increase |
| 50:50 | 16 | 35.3 | 48.5 | 13.2 |
| 33:67 | 18 | 34.1 | 51 | 16.9 |
| 4:96 | 12 | 33.1 | 60 | 26.9 |
| 0:100 | 16 | 31.3 | 60 | 28.7 |

EXAMPLE 5

A 46% solids content aqueous gel was prepared by the polymerisation of 30 parts acrylamide and 20 parts sodium acrylate in the presence of 50 parts potato starch acetate. This was miniced into small particles of about 5 mm and dispersed in twice its volume of a 40% aqueous solution of sodium polyacrylate having molecular weight about 3,800. The mixture was passed through a Silverson laboratory homogeniser and the resultant slurry filtered and the gel particles dried to give a free flowing granular polymer.

EXAMPLE 6

100 grams of polyacrylamide gel having 31% solids content were cut in 200 grams of a 40% solution of sodium polyacrylate having molecular weight about 3,800 using a Silverson mixer. The mixture was then transferred to a 500 ml resin pot and 9.5 grams of 46% sodium hydroxide was added. The mixture was heated to reflux and the ammonia that was evolved was collected and triturated against 1M HCl. When ammonia evolution ceased the reaction mix was cooled, the gel filtered and dried. The dried gel was ground and sieved to give a powder having a particle size range between 150 and 170 microns. The powder gave good dispersibility at 1% concentration in water and dissolved rapidly and completely. Upon analysis the powder was found to contain 27.6 mole percent sodium polyacrylate.

EXAMPLE 7

A cationic gel polymer was formed from 76.4% by weight acrylamide and 23.6% by weight dimethyl amino ethyl acrylate quaternised with methyl chloride and was a 39.6% by weight solids content gel having IV about 12. 500 g of this gel was passed through a mixer with a 5 mm multiple aperture plate to give strands of gel which were then cut manually to shorter lengths. These pieces were added over 22 minutes to 1,000 gg of a 42.7% by weight aqueous solution of polydiallyl dimethyl ammonium chloride in a laboratory homogeniser having a 9.5 mm 6-aperture head. When the addition was completed the homogeniser was operated for a further 3 minutes, and the slurry was then gently agitated for 1 hour. The slurry was filtered through a nylong mesh to yield a clear liquor and the processed gel was separated as discrete individual particles. The dry weight of the gel had increased from 39.6% before the process to 50.0% after the process and the dry weight of the cutting medium had dropped from 42.7% to 40.6%.

EXAMPLE 8

A 35% by weight gel was formed of a polymer of 74.5% acrylamide and 23.5% by weight sodium acrylate, with 2% urea. The gel was put through a mixer and 1 part by weight of the gel was stirred with 2 parts by weight of an aqueous solution containing equilibrating agent and was allowed to stand. The solutions that were tested were:
(1) 70% w/w aqueous triethyl phosphate,
(2) 70% w/w aqueous phosphated 2-mole ethoxylated 2-ethyl hexanol,
(3) 54% w/w aqueous sodium 2-ethyl hexyl sulphate,
(4) 50% w/w aqueous solution of the sodium salts of sulphated methyl isobutyl carbanol and 2-ethyl hexanol.

In each test the particles did not cake and flowed easily over one another.

The dispersion could be milled as described in Example 1 to produce a product of selected particle size.

We claim:

1. A process in which a water soluble or water swellable high molecular weight preformed polymer is dispersed into an aqueous medium to form a fluid composition comprising the polymer in the form of gel particles interconnected by the aqueous medium and the polymer is worked while present in said medium, characterized in that the gel particles have a size during the working of at least 20 microns and the aqueous medium is an aqueous solution of an equilibrating agent that substantially prevents aggregation or dissolution of the gel particles during working and in which the gel polymer and equilibrating agent are selected from the combinations of gel polymer and equilibrating agent consisting of (a) the gel polymer is an anionic polymer and the equilibrating agent is selected from water soluble anionic polymers of ethylenically unsaturated monomers, (b) the gel polymer is a cationic polymer and the equilibrating agent is selected from water soluble cationic polymers of ethylenically unsaturated monomers, polyethylene imine, and dimethylamineepichlorhydrin reaction product, (c) the gel polymer is a non-ionic polymer and the equilibrating agent is selected from water soluble anionic polymers of ethylenically unsaturated monomers and water soluble cationic polymers of ethylenically unsaturated monomers or (d) the gel polymer is a cellulosic or starch polymer and the equilibrating agent is a water soluble anionic polymer of ethylenically unsaturated monomers, and in which the concentration of equilibrating agent in the aqueous solution is 10 to 70% by weight and the ratio (dry weight) of gel polymer to equilibrating agent is from 1:0.5 to 1:10 and there is one to ten parts by weight aqueous solution of equilibrating agent per part by weight aqueous gel polymer particles.

2. A process according to claim 1 in which the working comprises milling the gel and separating the milled gel particles from the aqueous medium.

3. A process according to claim 1 in which the aqueous medium comprises a solution that draws water out of the gel particles, and the working comprises partially drying the gel particles by holding the gel particles in the aqueous medium for sufficient time to extract water from said gel particles, and separating the partially dried gel particles from the aqueous medium.

4. A process according to claim 1 in which the particles are separated from the aqueous medium after the working and are then dried by air.

5. A process according to claim 1 in which the particles are separated from the aqueous medium after the working, are dispersed in a non-aqueous liquid and are then dried by azeotroping.

6. A process according to claim 1 in which the working comprises extracting water soluble impurities from the gel by holding the gel particles in the aqueous medium for sufficient time to extract water soluble impurities from said gel particles.

7. A process according to claim 1 in which the working comprises transporting the polymer by flowing the fluid composition along a duct.

8. A process according to claim 1 in which the working comprises subjecting a polymer to chemical modification whilst in the aqueous medium.

9. A process according to claim 1 in which the gel polymer is anionic and the equilibrating agent is present in an amount of 0.5 parts per part by dry weight of the gel polymer and is a water soluble anionic polymer of ethylenically unsaturated monomers.

10. A process according to claim 1 in which the gel polymer is an anionic polymer of ethylenically unsaturated monomers comprising sodium acrylate and the equilibrating agent is water soluble sodium polyacrylate having molecular weight below 10,000.

11. A process according to claim 1 in which there is 1.2 to 5 parts by weight aqueous solution of equilibrating agent per part by weight aqueous gel polymer particles.

12. A process in which a water soluble or water swellable high molecular weight preformed polymer is dispersed into an aqueous medium to form a fluid composition comprising the polymer in the form of gel particles interconnected by the aqueous medium and the polymer is worked while present in said medium, characterized in that the gel particles have a size during the working of at least 20 microns and the aqueous medium is an aqueous solution of an equilibrating agent that substantially prevents aggregation or dissolution of the gel particles during working and in which the gel polymer is polyacrylamide or a cellulosic or starch polymer and the equilibrating agent is a water soluble anionic polymer of ethylenically unsaturated monomers and wherein the concentration of equilibrating agent in the aqueous solution is 10 to 70% by weight and the dry weight ratio of gel polymer to equilibrating agent is from 1:0.5 to 1:10 and there is one to ten parts by weight aqueous solution of equilibrating agent per part by weight aqueous gel polymer particles.

13. A process in which a water soluble or water swellable high molecular weight preformed polymer is dispersed into an aqueous medium to form a fluid composition comprising the polymer in the form of gel particles interconnected by the aqueous medium and the polymer is worked while present in said medium, characterized in that the gel particles have a size during the working of at least 20 microns and the aqueous medium is an aqueous solution of an equilibrating agent that substantially prevents aggregation or dissolution of the gel particles during working and in which the gel polymer is anionic and the equilibrating agent is a water soluble anionic polymer of ethylenically unsaturated monomers and wherein the concentration of equilibrating agent in the aqueous solution is 10 to 70% by weight, the dry weight ratio of gel polymer to equilibrating agent is from 1:0.5 to 1:10 and there is one to ten parts by weight aqueous solution of equilibrating agent per part by weight aqueous gel polymer particles.

14. A process in which a water soluble or water swellable high molecular weight preformed gel polymer is dispersed into an aqueous medium to form a fluid composition comprising the polymer in the form of gel particles interconnected by the aqueous medium and the polymer is worked while present in said aqueous medium by milling the polymer gel to form milled polymer gel particles, separating the milled polymer gel particles from the aqueous medium and partially drying the milled polymer gel particles, said process characterized in that the gel particles have a size of at least 20 microns during the working and the aqueous medium is an aqueous solution of an equilibrating agent that substantially prevents aggregation or dissolution of the gel particles during working, said equilibrating agent comprising a dissolved ionic polymer that is co-ionic with the gel polymer, and in which the concentration of equilibrating agent in the aqueous solution is 10 to 70% by weight and the ratio (dry weight) of gel polymer to equilibrating agent is from 1:0.5 to 1:10 and there is one to ten part by weight aqueous solution of equilibrating agent per part by weight aqueous gel polymer particles.

15. A process in which a water soluble or water swellable high molecular weight preformed polymer is dispersed into an aqueous medium to form a fluid composition comprising the polymer in the form of gel particles interconnected by the aqueous medium and the polymer is worked while present in said medium, characterized in that the gel particles have a size during the working of at least 20 microns and the aqueous medium is an aqueous solution of an equilibrating agent that substantially prevents aggregation or dissolution of the gel particles during working and in which the gel polymer is a cationic polymer of ethylenically unsaturated monomers and the equilibrating agent is selected from water soluble polydiallyldimethyl ammonium chloride, quaternised dialkylaminoalkyl(meth)acrylate and polyethylene imine and wherein the concentration of equilibrating agent in the aqueous solution is 10 to 70% by weight, the dry weight ratio of gel polymer of equilibrating agent is from 1:0.5 to 1:10 and there is one to ten parts by weight aqueous solution of equilibrating agent per part by weight aqueous gel polymer particles.

16. A process in which a water soluble or water swellable high molecular weight preformed gel polymer, which is a cationic polymer of ethylenically unsaturated monomers, is dispersed into an aqueous medium to form a fluid composition comprising the polymer in the form of gel particles interconnected by the aqueous medium and the polymer is worked while present in said medium, and in which the aqueous medium is an aqueous solution of an equilibrating agent selected from water soluble polydiallyldimethyl ammonium chloride, quaternised dialkylaminoalkyl(meth)acrylate and polyethylene imine, the concentration of equilibrating agent in the aqueous solution is 10 to 70% by weight, the dry weight ratio of gel polymer to equilibrating agent is from 1:0.5 to 1:10 and there is one to ten parts by weight aqueous solution equilibrating agent per part by weight aqueous gel polymer particles, and the working is selected from the group consisting of milling the gel particles, drying the gel particles by holding the gel particles in the aqueous medium for sufficient time to extract water from the particles, extracting water soluble impurities from the gel particles by holding the particles in the aqueous medium for sufficient time to extract the impurities from the particles, transporting the particles by flowing the fluid composition in a duct, and subjecting the gel polymer to chemical modification.

17. A process in which a water soluble or water swellable high molecular weight preformed gel polymer is dispersed into an aqueous medium to form a fluid composition comprising the polymer in the form of gel particles interconnected by the aqueous medium and the polymer is worked while present in said medium, and in which the aqueous medium is an aqueous solution of an equilibrating agent that comprises a dissolved ionic polymer that is co-ionic with the gel polymer, the concentration of equilibrating agent in the aqueous solution is 10 to 70% by weight, the dry weight ratio of gel polymer to equilibrating agent is from 1:0.5 to 1:10 and there is one to ten parts by weight aqueous solution of equilibrating agent per part by weight aqueous gel polymer particles, and the working is selected from the group consisting of milling the gel particles, drying the gel particles by holding the gel particles in the aqueous medium for sufficient time to extract water from the particles, extracting water soluble impurities from the gel particles by holding the particles in the aqueous medium for sufficient time to extract the impurities from the particles, transporting the particles by flowing the fluid composition in a duct, and subjecting the gel polymer to chemical modification.

18. A process according to claim 17 in which the equilibrating agent is polydiallyldimethyl ammonium chloride and the gel polymer is cationic.

19. A process according to claim 17 in which the aqueous medium is a solution of 15 to 55% by weight sodium polyacrylate and the gel polymer is a homopolymer of sodium acrylate or a copolymer of said acrylate with one or more non-ionic or anionic monomers.

20. A process according to claim 17 in which the aqueous medium is a solution of 10 to 50% by weight polydiallyl dimethyl ammonium chloride and the high molecular weight polymer is selected from polymers of dialkyl amino alkyl acrylates and methacrylates or acid addition or quaternary ammonium salts thereof.

21. A process according to claim 17 in which the gel polymer is an anionic polymer of ethylenically unsaturated monomers comprising sodium acrylate and the equilibrating agent is water soluble sodium polyacrylate having molecular weight below 10,000.

* * * * *